Patented June 13, 1944

2,350,977

UNITED STATES PATENT OFFICE 2,350,977

COMPOSITION TO BE USED AS A BINDER IN ROAD CONSTRUCTION AND ITS PROCESS OF MANUFACTURE

Carl Alexander Agthe, Zurich, Switzerland, assignor to the firm J. R. Geigy A. G., Basel, Switzerland No Drawing. Application December 8, 1939, Serial No. 308,295. In Switzerland January 5, 1939

2 Claims. (Cl. 106—220)

In many cases, in particular in road construction where the provision of pale or colored trackways and areas is wanted, it would be desirable to use pale or transparent products in place of black bituminous binders such as asphalts or tars. But only very few raw materials are available for the production of such binders. The literature mainly proposes the use of resins and among these rosin comes primarily into consideration, being obtainable in sufficient quantities and relatively cheaply. By itself rosin has the great disadvantage of being brittle; it is also unsuitable when mixed with oils because such mixtures also incline to brittleness. This is the reason that hitherto rosin preparations have not come into use as binders in road construction.

It has now been found that binders can be made from rosin which satisfy all requirements. They possess lasting adhesiveness and retain a certain degree of softness at the most varied temperatures, upon which quality particular value is placed in road construction. To this end it is necessary, according to the invention, to combine the rosin with non-drying vegetable oils and to treat the mixture with basic compounds of alkaline earth metals, heat being used in some cases. By the term "non-drying" used in this specification and the claims is meant an oil which will not dry at all or not dry completely; it may be an entirely non-drying oil or a semi-drying oil. Surprisingly, it has been found that only such combination leads to weather-resisting binders with high adhesive strength.

If instead of with the non-drying vegetable oils, rosin is melted with other oils, for example mineral oils or the frequently recommended resin- or tar-oils, masses are obtained which in the course of time become hard and brittle, and this is so whether the preparation has been treated with basic alkaline-earth compounds or not. It must be mentioned however that small quantities of other oils such as mineral oils, resin oils etc. can be added without harm to the binder produced according to the invention. But the non-drying vegetable oils followed by treatment with basic alkaline earth compounds which can be carried out at ordinary temperature or under heat, are indispensable.

In road construction for example, where the new binder is used with stone, the procedure can consist in the rosin-oil-mixture being used with basic stone which is present in part in powder form and gives the binder the desired properties.

For example rape-seed oil, soya-bean oil, castor oil and so forth can be used as the non-drying vegetable oil. Calcium-, magnesium- or bariumoxide, hydroxides, basic stone and so forth can be used as the basic alkaline earth compounds. The properties of the new binder can be further desirably influenced by suitable additions; for example it is advantageous to add a small quantity say ½–2% of paraffin or a corresponding quantity of paraffin-like substances. Resins such as cumarone-resin, rosin ester and the like, further pale varieties of asphalt, rubber, chlorinated rubber or other rubber derivatives, polyvinylchloride and the like can in some circumstances also be added for the production of binders with determined properties.

According to the present process binders of varying consistency, from fluid products up to solid masses can be produced. The proportions of the materials to be used will be determined according to the purpose for which the binder is required. In road construction, for example for surface treatment a preparation will be made which is softer and contains more oil than a binder for the actual layers, for which viscous to solid preparations are preferred. The degree of softness of the binder can also be determined by the quantity of the basic alkaline earth compounds which exert a viscosity increasing effect. For binders which are not to be tough and solid, solvents such as anthracene oil or gas oil can be added in large quantities for instance up to 20% and more, to the preparations made according to the invention.

The following examples illustrate the invention:

Example 1

70 kg. of rosin and 30 kg. of rape seed oil are melted under heat to a homogeneous mass. This mixture can be used for example for the production of a pale layer material, with basic stone. For this purpose for example a mixture of 90 parts of dry, broken limestone of graduated grain size, which has been heated to 80° C., and 10 parts of limestone filler, is coated with 9 parts of the above rosin-rape-seed-oil mixture. A pale-colored layer mass is obtained, which under traffic well resists weather because a hardening process takes place between the basic stone and the organic mixture.

Example 2

60 kg. of rosin, 20 kg. of soya-bean oil and 20 kg. of anthracene oil are melted together under heat, and 1.5 kg. calcium oxide then added and the material then heated under reflux to about 130° C. for 8 hours while stirring. A pale, highly viscous binder results, having good adhesive strength, which can be used in road construction for example for surface treatment.

Example 3

70 kg. of rosin and 30 kg. of castor oil are melted together and then treated under heat at 150° C. with 1.5 kg. of magnesium oxide. The mixture is allowed to cool to 80–100° C. and 2 kg. of a mineral oil, such as petroleum, gas-oil, etc., are then added. An asphalt-like mass results of great adhesive strength.

The binders made according to the invention can be used as such or fluxed with solvents such as anthracene-oil, tar-oil, gas-oil, solvent-naphtha, etc. They can also be intermixed with convenient, easily volatile solvents and then be used in cold fluid state. For the same purpose, their conversion into emulsions may also be taken into consideration.

What I claim is:

1. A process for the production of a roadmaking material, which comprises melting together 60 parts of rosin, 20 parts of soya bean oil and 20 parts of anthraquinone oil, adding 1½ parts of calcium oxide and then heating the material under reflux to about 130° C. for 8 hours while stirring.

2. A binder for use in roadmaking consisting of the product resulting from melting together 60 parts of rosin, 20 parts of soya bean oil and 20 parts of anthraquinone oil, adding 1½ parts of calcium oxide and then heating the material under reflux to about 130° C. for 8 hours while stirring.

CARL ALEXANDER AGTHE.